P. SMITH.
VEHICLE.
APPLICATION FILED APR. 18, 1919.

1,328,343.

Patented Jan. 20, 1920.

INVENTOR.
Philester Smith
BY Davis & Simms
his ATTORNEYS.

UNITED STATES PATENT OFFICE.

PHILESTER SMITH, OF ROCHESTER, NEW YORK.

VEHICLE.

1,328,343. Specification of Letters Patent. Patented Jan. 20, 1920.

Application filed April 18, 1919. Serial No. 291,164.

*To all whom it may concern:*

Be it known that I, PHILESTER SMITH, a citizen of the United States, and resident of Rochester, in the county of Monroe and State of New York, have invented certain new and useful Improvements in Vehicles, of which the following is a specification.

The present invention relates to vehicles and an object of the invention is to provide a simple and inexpensive mounting for the seat which will permit the latter to be situated at different heights as well as to be arranged different distances from the forward part of the vehicle so as to adapt the vehicle to children of different sizes. Another object of the invention is to provide a steering handle which is adapted to project rearwardly at an angle to the steering post of a vehicle or may be held in line with the steering post so that the vehicle may be controlled by children of different sizes.

To these and other ends the invention consists of certain parts and combinations of parts, all of which will be hereinafter described, the novel features being pointed out in the appended claims.

Figure 1:
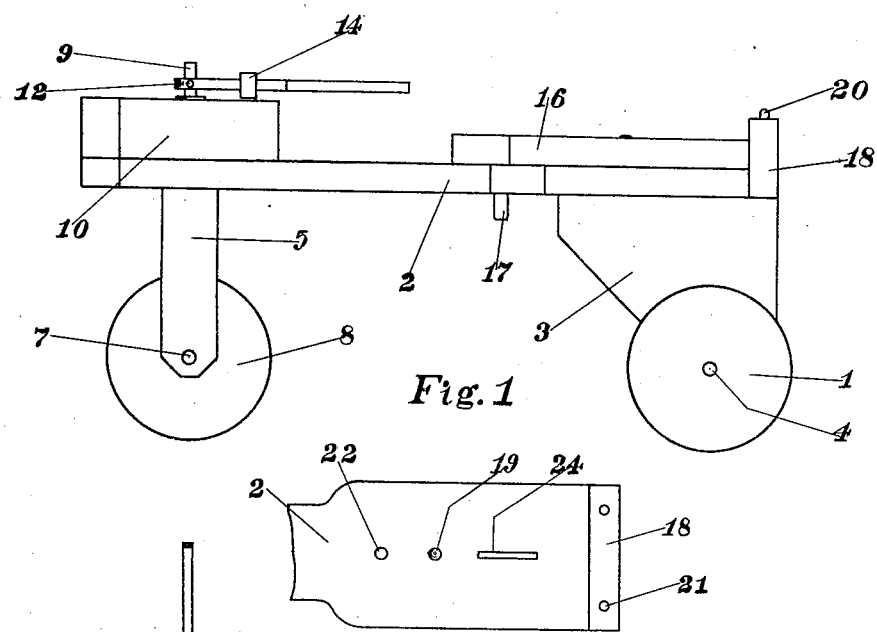
Figure 1 is a side view of a vehicle with the handle for the steering post arranged at an angle to the steering post and a seat arranged in its forward position.
Figure 3:
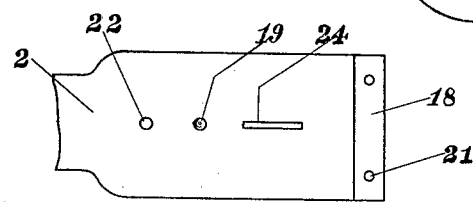
Fig. 3 is a top view of the rear end of the frame board of the vehicle.

Referring more particularly to the drawing, 1 indicates the rear supporting wheels of the vehicle supporting a frame comprising a frame board 2 having bearing blocks 3 secured on the under side at the rear end thereof and carrying the shaft 4 of the supporting wheels 1. At the forward end of the frame board 2 a steering post 5 is mounted to turn preferably through a bearing portion 6 extending into the board. This post may be bifurcated at its lower end and in the arms of the bifurcated portion, a shaft 7 is mounted with a steering wheel 8 arranged thereon. The post 5 in this instance has an extension 9 projecting upwardly from the portion 5 above the top of the block 10 which is secured to the upper surface at the forward end of the frame board 2 to strengthen the latter.

Figure 2:
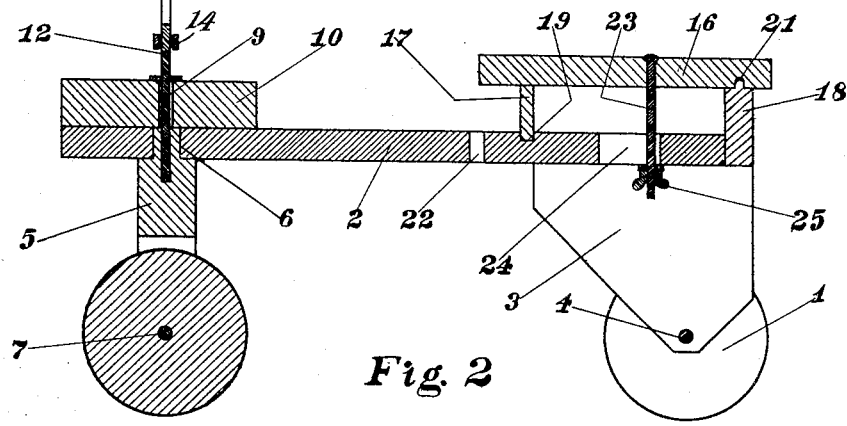
Fig. 2 is a vertical central section through the vehicle showing the handle for the steering post secured in line with the post and the seat adjusted to its rearmost position.
Figure 4:
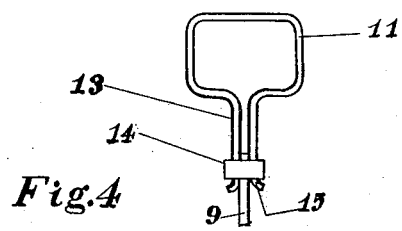
Fig. 4 is a detail view of the steering handle.

To this projecting portion of the steering post extension a handle is pivoted at 12. This handle in this instance is in the form of a single piece of metal bent between its ends to provide the loop portion 11 with its ends being extended in parallel relation as at 13 so as to connect with the pivot 12 on opposite sides of the post extension 9. By causing the handle to lie at an angle to the steering post as shown in Fig. 1 it is possible for a small child to steer the vehicle with little difficulty. For a larger child the handle is thrown to the upright position shown in Fig. 2 in line with the steering post and is held in this position by a locking device comprising in this instance a sleeve 14 mounted to move downwardly upon the parallel portions 13 of the handle until the upper end of the post extension is reached, when the sleeve will retain the handle against swinging on the post extension. The lower ends of the parallel portions 13 may be turned outwardly at 15 so as to limit the downward movement of the sleeve 14 on the parallel portions 13. This lock provides a rigid connection between the handle and the steering post and permits the vehicle to be steered by imparting a turning movement to the handle about a vertical axis.

The seat for the vehicle is in this instance in the form of a board 16 adapted in one position to rest upon the upper surface of the frame board 2 as shown in Fig. 1. This seat board 16 is also adapted to assume another position in a higher plane than and in rear of the position shown in Fig. 1. The means for effecting this result in this instance consists of a depending projection 17 on the forward part of the seat board 16 and a transverse piece 18 secured to the bearing blocks 3 at the rear of the frame board 2 to project upwardly above said frame board. The upper surface of the frame board 2 may be provided with a depressed pocket or seat 19 in which the projection 17 rests when the seat 16 is in its elevated position and the transverse piece 18 is provided with two projections 20 which extend into depressions 21 formed in the under surface of the seat board 16. When the seat board 16 is in its lowered position, the seat board lies in front of the transverse piece 18 and consequently is in advance of the elevated position, the frame board 2 having an opening 22 through which the projection 17 depends during the lowered position of the seat board 16.

Any suitable means may be employed for securing the seat board 16 in its two positions. In this instance, the seat board 16 carries a depending bolt 23 which projects through a longitudinally extending slot 24 in the frame board. This bolt has a thumb nut 25 thereon which is arranged to hold the seat board 16 toward the frame board 2 in both positions of the seat board 16.

According to the present invention there has been provided a vehicle in which the seat may not only be held at different distances from the steering wheel but it may also be held at different distances from the surface with which the feet of the user of the vehicle engage for the purpose of propelling such vehicle. The steering post has a handle which is pivotally connected thereto to turn about a horizontal axis so that the handle may control the steering post while lying at an angle to such post, provision being made by which the handle may be held in line with the post so that the twisting of the handle will steer the vehicle, this latter adjustment being more desirable for larger children.

What I claim as my invention and desire to secure by Letters Patent is:

1. In a vehicle having a steering post, a handle formed from a single piece of material bent to provide a loop, and two parallel portions, the parallel portions being pivoted to the steering post below the upper end of the latter and on opposite sides thereof, and a sleeve mounted on said parallel portions of the handle and adapted to move to coöperate with the upper end of the post to prevent the pivoting of the handle on the post.

2. A vehicle comprising a board acting as a frame, an upward projection thereon adjacent the rear of the frame, and a seat having a depending projection at its forward portion arranged to rest upon the board when the seat rests upon the projection adjacent the rear of the frame, said seat being detachably connected to the upward projection and said board being formed to permit the seat to rest thereon in front of said upward projection.

3. In a vehicle, a frame board formed with a vertical opening and also with an upwardly opening pocket in its top face, supporting wheels adjacent the rear portion of the frame board, a steering wheel at the forward portion of the frame board, a transverse support projecting upwardly adjacent the rear end of the frame board and having projections on its upper edge, and a seat having a depending projection at its forward end to rest in the pocket in the frame board when the seat rests upon the transverse support, said seat also being adapted to rest in direct abutment with the upper surface of the frame board in advance of the transverse support, the depending projection on the seat at this time extending through the vertical opening of the frame board.

4. In a vehicle, a board acting as a frame and provided with a slot, a seat arranged to rest on the top face of the board, a support projecting above the top face of the board, and a bolt connected with the seat and operating in said slot to hold the seat either on the top face of the board or on the support.

5. In a vehicle, a frame board provided with a slot, an upwardly extending support adjacent the rear end of the frame board, a seat having a depending projection adjacent its forward end, said seat being adapted to rest on the top face of the frame board or to be supported in a position in a higher plane and to the rear of the first named position through the upwardly extending support and projection, and a bolt carried by said seat and extending through said slot to hold the seat in either position.

PHILESTER SMITH.